United States Patent
Zadoorian et al.

(10) Patent No.: US 8,234,209 B2
(45) Date of Patent: *Jul. 31, 2012

(54) METHOD OF COLLECTING DELINQUENT SPECIALIZED DEBT

(76) Inventors: James A. Zadoorian, Bluffton, SC (US); Joseph LaManna, Purchase, NY (US); Christopher Golden, Greenlawn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/064,806

(22) Filed: Apr. 18, 2011

(65) Prior Publication Data

US 2011/0196811 A1 Aug. 11, 2011

Related U.S. Application Data

(63) Continuation of application No. 12/068,041, filed on Feb. 1, 2008, now Pat. No. 7,949,597.

(51) Int. Cl.
*G06Q 40/00* (2006.01)
(52) U.S. Cl. .............................. 705/37; 705/38; 705/35
(58) Field of Classification Search .................... 705/37, 705/38, 35
See application file for complete search history.

(56) References Cited

U.S. PATENT DOCUMENTS

| 6,064,971 | A | * | 5/2000 | Hartnett | 706/46 |
| 6,161,099 | A | * | 12/2000 | Harrington et al. | 705/36 R |
| 2002/0169708 | A1 | * | 11/2002 | Chittenden | 705/37 |
| 2003/0220867 | A1 | * | 11/2003 | Goodwin et al. | 705/37 |
| 2006/0206438 | A1 | * | 9/2006 | Sakaue et al. | 705/80 |
| 2007/0150365 | A1 | * | 6/2007 | Bolivar | 705/26 |

* cited by examiner

*Primary Examiner* — Lindsay M. Maguire
(74) *Attorney, Agent, or Firm* — Leander F. Aulisio

(57) ABSTRACT

An internet-based system for organization and collection of specialized debt that is delinquent; an example of specialized debt being healthcare debt.

3 Claims, No Drawings

METHOD OF COLLECTING DELINQUENT SPECIALIZED DEBT

The present application is a continuation application of U.S. patent application Ser. No. 12/068,041; now U.S. Pat. No. 7,949,597.

BACKGROUND OF THE INVENTION

One of the highest priorities of the present healthcare system is the ability to collect bad debt. The healthcare system is not able to demand full, prompt payment for healthcare services; and thus there is a large amount of unpaid debt carried by the system. Some industry analysts estimate that hospitals are underpaid by an amount of 5-10% annually by third-party payers, leaving a significant amount of money on the table. Furthermore; some 45 million Americans do not carry health care insurance. Many more Americans face higher deductibles, erosion on coverage and long periods of no insurance. Estimates show that self-pay accounts tend to have a higher number of gross days revenue outstanding for hospitals.

Across the United States alone, estimates show that the amount of bad debt (in the form of accounts receivable from patients) owed to the hospitals, physician practices, nursing homes and the like is on the order of hundreds of billions of dollars. The bad debt problem is the principal driving force behind the chronic cash-flow problems and weak financial vital signs of hospitals.

The bad debt problem is the principal driving force behind the chronic cash-flow problems and weak financial vital signs currently plaguing our nation's healthcare providers. Recent reports attribute the share price downgrades, declines and earnings shortfalls of many American-based healthcare providers to unpaid medical bills, a condition that has plagued these companies for years.

Presently, healthcare providers set aside over $129 billion annually to cover bad debt, amounting to roughly 7 percent of the industry's revenues, and more than double the industry's average net profits of 3 percent. This statistic underscores the magnitude of the problem and the importance of managing the impact of bad debt within the confines of the provider's overall financial portfolio, while providing testament to the importance of recovering bad debt as one of the provider's highest ongoing priorities.

US Published Patent Application 2003/0018563, to Kilgour et al, relates to a method for facilitating a financial investment in at least one accounts receivable owned by a first person, the method comprising the steps of: obtaining a systems manager employing a computer-based system, enrolling the at least one accounts receivable owned by the first person as a lot for a trade using a computer database, receiving at least one bid from at least one bidder for purchasing the lot, and determining the result of the trade for the lot, wherein each account receivable of the at least one accounts receivable is associated with a merchant's buyer and a merchant.

US Published Patent Application 2002/0169708, to Chittenden, relates to a competitive sealed bidding system and a method therefore. The publication disclose and claims a method for competitively sealed bidding on debt obligations over a computer network, the method comprising: inputting a first data into the computer network, the first data associated with a debt obligation desired by a borrower including a bid due date, inputting a second data into the computer network, the second data associated with a bid request including a rate of the debt obligation by a lender to underwrite the debt obligation desired by the borrower, and concealing from the borrower until the bid due date at least the rate of the debt obligation bid by the lender on the computer network.

There is a need for a method of reversing the downward spiraling of healthcare services' bottom line. All healthcare services can benefit by employing a centralized process for obtaining sources that can readily collect bad debt generated by unpaid and overdue accounts receivable.

SUMMARY OF THE INVENTION

The present invention seeks to reduce the burden of bad debt that is crushing the healthcare system. Sophisticated transaction strategies are employed, including on-line internet-based auctions for dispersing the accounts receivable. Software-based processes extract overdue claims for posting directly from a healthcare providers' revenue cycle management system. The overdue claims set for posting are organized algorithmically by a software-based process. Claims that are well-suited for recovery are identified and posted. A competitive bidding process allows certified recovery agencies the ability to first review the posted claims, and then to bid on the set of claims that they judge as desirable for their own method of recovery. Hospitals and other healthcare providers compare bids, award winners and clear bad debt from their revenue cycle management system.

As the uncollected receivables problem continues to negatively impact profitability, healthcare providers have searched the landscape for innovative solutions to reverse the downward spiraling of returns associated with delinquent receivables. This has fueled a frenzied, but largely unsuccessful attempt by the healthcare community to collect on outstanding debts. As a result, the accounts receivable management (ARM) industry has sought to develop solutions to meet healthcare providers' demand for debt recovery. To date, the ARM industry has generated only $2.4 billion in healthcare revenues recovered, or less than 2% of the overall $129 billion market.

The inability of the ARM industry to respond to market demand or to generate meaningful returns largely reflects the poorly organized marketplace in which trading occurs. Present methods do not organize the healthcare debt supply in an intuitive or easily accessible manner in which the ARM industry can expeditiously and accurately determine its relative value. Informational asymmetries exist as to the qualifications and attributes of various ARM agents. Monopolistic behavior is pervasive. Price transparency is relatively nonexistent and the market lacks an appropriate degree of standardization, performance benchmarking and safeguard protections against collections malfeasance. Collectively, these factors have led to considerable opportunities to organize the healthcare receivables and bad debt recovery market

DETAILED DESCRIPTION OF THE INVENTION

The present invention relates to an interactive internet-based system for conducting competitive bidding on overdue accounts receivable held by at least one healthcare provider. The system comprises electronic processors, electronic input-output devices for communicating information, a computer database, and a communications network. The computer database is linked to a website on the internet by means of a first electronic input-output device. The website can be accessed by the at least one healthcare provider to send a portfolio of overdue accounts receivable from a software-based revenue cycle management platform to the computer database by means of a second electronic input-output device. The computer database comprises a first software means for sorting the portfolio based on a set of pre-determined parameters; a second software means for organizing the portfolio of overdue accounts receivable by region, state, city, zip code, outstanding balance amounts, the age of accounts, and a score based on a "collect ability" scale; the second software means further for ranking the overdue accounts receivable from most collectable to least collectable, and a third software means for generating a score for the portfolio, thus obtaining a scored portfolio. The score is based on a "collectability" scale. The website can be accessed by one or more debt recovery agencies to review the scored portfolio. The computer database is connected to the communications network by means of a third electronic input-output device, the communications network comprising a fourth software means for allowing the one or more debt recovery agencies to place bids on the portfolio.

The interactive internet-based system includes a website that can be further accessed by the at least one healthcare provider to review bids placed on the portfolio. The computer database is connected to the communications network by means of a fourth electronic input-output device. The communications network further comprises a fifth software means for allowing the at least one healthcare provider to contact the one debt recovery agency that wins the right to collect the portfolio of overdue accounts receivable. Preferably, the right to collect the portfolio of overdue accounts receivable is an exclusive recovery right.

The system adds an additional important capability through the creation of a rating system to inform healthcare providers of the relative business attributes of prospective ARM agents. This rating system includes a "stars" rating for individual ARM companies, similar to those being utilized by Morningstar, Standard & Poors, and Moody's today. The system further comprises a "community feedback system" where healthcare providers can provide written comments about their experience with various ARM agents that currently work their debt portfolios.

The set of pre-determined parameters for sorting the portfolio of overdue accounts receivable comprises: inpatient/outpatient status of service provided, amount of money due, length of time that an account receivable is overdue, and past history of uncollected debt. The set of parameters further comprises, for each account receivable, medical information, insurance information, billing information, demographic information, amount of money that the winning bidder receives upon collection of the debt, and instructions for bidding on the portfolio of overdue accounts receivable. This set of parameters further comprises a portfolio identification number, seller identification number, account identification number, client account number, guarantor social security number, guarantor date of birth, guarantor last name, guarantor first name, guarantor address, guarantor city, guarantor state guarantor zip, guarantor phone, guarantor employer, guarantor work phone patient first name, patient last name, placement amount, date of service last payment date, notes, age of account, date of last payment, inpatient outpatient service designation, and financial class.

The healthcare provider is a member selected from the groups consisting of: a hospital, a physician practice, an urgent care facility, a walk-in clinic, a dental office, doctor's office, an ambulatory surgery center, a chiropractic office, an eye care specialist, a nursing home, a home healthcare agency, a birthing facility and a personal care provider.

The present invention relates to an internet-based system for collection of overdue accounts receivable held by a healthcare provider comprising a first homepage software means for allowing at least one healthcare provider to log onto the system. The system further comprises a second homepage software means for allowing debt recovery agencies to log onto the system; a gathering software means for allowing the at least one healthcare provider to extract a set of overdue claims from a software-based revenue cycle management platform; submitting software for allowing the at least one health care provider to submit the set of overdue claims to the system. The system further comprises algorithmic software means for analyzing the set of claims and ranking the set of claims from most collectable claim to least collectable claim, thus providing a ranked set of claims. Said system further comprises transferring software means for removing the ranked set of claims to an online bidding platform; scanning software means for allowing the debt recovery agencies to review the ranked set of claims on the online bidding platform; auctioning software means for allowing the debt recovery agencies to place bids on the ranked set of claims; reviewing software means for allowing the at least one healthcare provider to review bids placed on the ranked set of claims; and communicating software means for allowing the at least one healthcare provider to contact the debt recovery agency that submitted a winning bid.

The reviewing software means further comprises means for allowing the healthcare providers to access a rating system relating to business attributes of prospective ARM agents bidding on their portfolios. The rating system comprises a "stars" rating for ARM companies, similar to those being utilized by Morningstar, Standard & Pours, and Moody's. The reviewing software means further comprises means for healthcare providers to access a "community feedback system" where healthcare providers can provide written comments about their experience with various ARM agents bidding on their portfolios.

The software-based revenue cycle management platform comprises, for each overdue account receivable, information comprising: in-patient/out-patient status of service provided, amount of money due and length of time an account receivable is overdue. The software-based revenue cycle management platform comprises, for each overdue account receivable, information further comprising: medical information, insurance information, billing information, demographic information, and amount of money that the winning bidder receives upon collection of the debt. This set of parameters further comprises a portfolio identification number, seller identification number, account identification number, client account number, guarantor social security number, guarantor date of birth, guarantor last name, guarantor first name, guarantor address, guarantor city, guarantor state guarantor zip, guarantor phone, guarantor employer, guarantor work phone patient first name, patient last name, placement amount, date of service last payment date, notes, age of account, date of last payment, inpatient outpatient service designation, and financial class. The online bidding platform also comprises directions for placing bids on the ranked set of claims.

The present method for the collection of overdue accounts receivable held by healthcare providers comprises establishing an internet-based system for bidding on a collection of overdue accounts. At least one healthcare provider is contacted. At least two debt collection agencies are then contacted. The at least one healthcare provider and the at least two debt collection agencies are connected to the internet-based system. The system comprises: a first homepage software means for allowing the at least one healthcare provider to log onto the system; a second homepage software means for allowing the at least two debt collection agencies to log onto the system; gathering software means for allowing the at least one healthcare provider to extract a set of overdue claims from a software-based revenue cycle management platform;

submitting software means for allowing the at least one healthcare provider to submit the set of overdue claims to the system; algorithmic software means for analyzing the set of claims and ranking the set of claims from most collectable claim to least collectable claim to obtain a ranked set of claims; transferring software means for removing the ranked set of claims to an online bidding platform; scanning software means for allowing the at least two debt collection agencies to review the ranked set of claims on the online bidding platform; auctioning software means for allowing the at least two debt collection agencies to place bids on the ranked set of claims; reviewing software means for allowing the at least one healthcare provider to review bids placed on the ranked set of claims, the reviewing software means further comprising means for allowing the at least one healthcare provider to review bids placed on the ranked set of claims, the reviewing software means further comprising means for healthcare providers to access a rating system relating to business attributes of prospective ARM agents bidding on their portfolios, the rating system including a "stars" rating for ARM companies, similar to those being utilized by Morningstar, Standard & Pours, and Moody's, the reviewing software means further providing means for healthcare providers to access a "community feedback system" where healthcare providers can provide written comments about their experience with various ARM agents bidding on their portfolios; and communicating software means for allowing the at least one healthcare provider to contact the debt recovery agency that submitted a winning bid. The debt collection agency that submitted the winning bid collects the overdue accounts receivable held by the at least one healthcare provider. The online bidding platform comprises directions for placing bids on the ranked set of claims. The software-based revenue cycle management platform comprises, for each overdue account receivable, information further comprising: medical information, insurance information, billing information, demographic information and amount of money that a winning bidder receives upon collection of the debt.

The software-based revenue cycle management platform further comprises a portfolio identification number, seller identification number, account identification number, client account number, guarantor social security number, guarantor date of birth, guarantor last name, guarantor first name, guarantor address, guarantor city, guarantor state guarantor zip, guarantor phone, guarantor employer, guarantor work phone patient first name, patient last name, placement amount, date of service last payment date, notes, age of account, date of last payment, inpatient outpatient service designation, financial class. Preferably, the debt recovery and communicating software means for allowing the at least one healthcare provider to contact the debt recovery agency that submitted a winning bid; The debt collection agency that submitted the winning bid collects the overdue accounts receivable held by the at least one healthcare provider. The online bidding platform comprises directions for placing bids on the ranked set of claims. Preferably, the debt recovery agency that submits the winning bid obtains an exclusive recovery right.

An interactive internet-based system is disclosed wherein the set of pre-determined parameters for sorting the portfolio of overdue accounts receivable comprises: inpatient/outpatient status of service provided, amount of money due, length of time that an account receivable is overdue, and past history of uncollected debt. The set of parameters further comprises for each account receivable: medical information, insurance information, billing information, demographic information, amount of money that the winning bidder receives upon collection of the debt, and instructions for bidding on the portfolio of delinquent accounts receivable. The healthcare provider is a member selected from the groups consisting of: a hospital, a physician practice, an urgent care facility, a walk-in clinic, a dental office, doctor's office, a chiropractic office, an eye care specialist, a nursing home, a home healthcare agency, a birthing facility and a personal care provider.

An internet-based system for collection of overdue accounts receivable held by a healthcare provider is presently disclosed in this application. The system comprises a first homepage software means for allowing at least one healthcare provider to log onto the system; a second homepage software means for allowing debt recovery agencies to log onto the system; a gathering software means for allowing the at least one healthcare provider to extract a set of overdue claims from a software-based revenue cycle management platform; a submitting software for allowing the at least one health care provider to submit the set of overdue claims to the system; an algorithmic software means for analyzing the set of claims and ranking the set of claims from most collectable claim to least collectable claim, thus providing a ranked set of claims; a transferring software means for removing the ranked set of claims to an online bidding platform; a scanning software means for allowing the debt recovery agencies to review the ranked set of claims on the online bidding platform; an auctioning software means for allowing the debt recovery agencies to place bids on the ranked set of claims; a reviewing software means for allowing the at least one healthcare provider to review bids placed on the ranked set of claims; and a communicating software means for allowing the at least one healthcare provider to contact the debt recovery agency that submitted a winning bid.

The healthcare provider is a member selected from the group consisting of: a hospital, a physicians practice, an urgent care facility, a walk-in clinic, a dental office, a chiropractic office, an eye-care specialist, a nursing home, a home healthcare agency, and a personal care provider.

The software-based revenue cycle management platform comprises, for each overdue account receivable, information comprising: in-patient/out-patient status of service provided, amount of money due and length of time an account receivable is overdue. The software-based revenue cycle management platform comprises, for each overdue account receivable, information further comprising: medical information, insurance information, billing information, demographic information, and amount of money that the winning bidder receives upon collection of the debt.

The online bidding platform comprises directions for placing bids on the ranked set of claims. Preferably, all the collection agencies that wish to place bids on the overdue accounts receivable are pre-screened before they are allowed to view the various sets of claims up for bidding. Only reputable collection agencies are permitted to become part of the internet-based "community" that exercises bidding opportunities. A pre-screening ritual allows the system to construct a database of reputable collection agencies.

A method for the collection of overdue accounts receivable held by healthcare providers is disclosed. The method comprises the steps of: establishing an internet-based system for bidding on a collection of overdue accounts; contacting at least one healthcare provider; contacting at least two debt collection agencies; and connecting both the at least one healthcare provider and the at least two debt collection agencies to the internet-based system. The system comprises: a first homepage software means for allowing the at least one healthcare provider to log onto the system; a second homepage software means for allowing the at least two debt collection agencies to log onto the system; gathering software means for allowing the at least one healthcare provider to extract a set of overdue claims from a software-based revenue cycle management platform; submitting software means for allowing the at least one healthcare provider to submit the set of overdue claims to the system; algorithmic software means for analyzing the set of claims and ranking the set of claims from most collectable claim to least collectable claim to obtain a ranked set of claims; transferring software means for removing the ranked set of claims to an online bidding platform; scanning software means for allowing the at least two debt collection agencies to review the ranked set of claims on the online bidding platform; auctioning software means for allowing the at least two debt collection agencies to place bids on the ranked set of claims; reviewing software means for allowing the at least one healthcare provider to review bids placed on the ranked set of claims; and communicating software means for allowing the at least one healthcare provider to contact the debt recovery agency that submitted a winning bid. The debt collection agency that submitted the winning bid then collects the overdue accounts receivable held by the at least one healthcare provider.

The present method comprises directions for placing bids on the ranked set of claims. These directions can be supplied by a software means that can be accessed on the internet by a collection agency. The directions can include steps to be taken by the collection agency if it wants to become part of the on-line "community" that is allowed to place bets on the various portfolios of debt.

The software-based revenue cycle management platform comprises, for each overdue account receivable, information further comprising: medical information, insurance information, billing information, demographic information and amount of money that a winning bidder receives upon collection of the debt. Winning bid obtains an exclusive recovery right.

An interactive internet-based system for conducting competitive bidding on overdue accounts receivable held by at least one healthcare provider is hereby disclosed. The system comprises electronic processors, electronic input-output devices for communicating information, a computer database, and a communications network The computer database is linked to a website on the internet by means of a first electronic input-output device The website can be accessed by the at least one healthcare provider to send a portfolio of overdue accounts receivable. The portfolio is obtained from a software-based revenue cycle management platform located at the at least one health care provider. The portfolio is then sent to the computer database by means of a second electronic input-output device. The computer database comprises a first software means for sorting the portfolio based on a set of pre-determined parameters, ranking the overdue accounts receivable from most collectable to least collectable, generating at least two subsets from the portfolio of overdue accounts receivable, and then generating a score for each of the at least two subsets of the portfolio of overdue accounts receivable. The score is based on a "collectability" scale. The website can be accessed by one or more debt recovery agencies to review the scored portfolio. The computer database is connected to the communications network by means of a third electronic input-output device. The communications network comprises a second software means for allowing the one or more debt recovery agencies to place bids on the portfolio.

The website can be further accessed by the at least one healthcare provider to review bids placed on each of the at least two subsets generated from the portfolio of overdue accounts receivable. The computer database is connected to the communications network by means of a fourth electronic input-output device. The communications network comprises a third software means for allowing the at least one healthcare provider to contact the debt recovery agency that wins the right to collect the portfolio of each of the at least two subsets generated from the portfolio of accounts receivable.

A method of organizing delinquent specialized debt to obtain a portfolio of specialized debt is disclosed. The method comprises the following steps: (1) providing a secure website on the internet for access by at least one holder of specialized debt; (2) obtaining over the website at least one segment of the delinquent specialized debt from the at least one holder, wherein the specialized debt is disorganized; and (3) organizing the at least one segment of delinquent specialized debt into a portfolio of specialized debt. The portfolio of specialized debt has a value that is presentable to a community of selective buyers for bidding on said portfolio. In a preferred embodiment, the holder of the specialized debt is a healthcare provider.

The specialized debt held by the healthcare provider has the following properties. Patient privacy requirements as outlined by HIPAA (Health Insurance Portability and Accountability Act of 1996) are attached to the debt. State and federal regulatory requirements govern the debt. Market image requirements of healthcare executives must also be considered.

Relatively disorganized specialized debt is presently organized by a novel method that includes the steps of: (a) sorting at least one segment of delinquent specialized debt by sorting parameters to obtain a sorted segment of delinquent specialized debt; (b) ranking the sorted segment of debt by a ranking parameter to obtain a ranked segment of delinquent specialized debt; and (c) scoring the ranked set of debt by a scoring parameter to obtain a portfolio of specialized debt. The portfolio of specialized debt has a value that is presentable to a community of selective buyers of said portfolio for bidding on said portfolio.

The sorting parameters comprise, for each specific delinquent account: (a) outstanding unpaid balance; (b) age of account; (c) prior collection history; (d) demographics of the debtor profile, based on household income and home value; (e) geographic distribution of debtor, based on a parameter which is a member selected from a state and a zip code; (f) type of service provided to the debtor (grouped by DRG codes); (g) date of service provided (grouped in 30 day increments from posting date); and (h) type of debtor/payer classification, the type being a member selected from the group consisting of individual, insurance provider and government provider.

The ranking parameter comprises: (a) an intrinsic value for each sorting parameter; and (b) a comparative value for each sorting parameter. The ranking parameter is a flexible parameter that can be changed or modified over time. In other words, the intrinsic value of each of the sorting parameters can be altered if better results relating to the bidding on the portfolio of specialized debt can be obtained. Also, the comparative value of the sorting parameter can be modified for better results. A "weighting feature" makes the comparative value different than the intrinsic value. For example, if analysts believe that home value of individual debtor is twice as likely to influence "collectability" of the delinquent debt, then the "weighting feature" is 2. Thus, if the intrinsic value of "home value" is 5 (a median on a scale of 1-10, where 10 is the highest score), then the comparative value of "home value" is 2 (times) 5 or 10.

The scoring parameter comprises a calculation to obtain a final score for the portfolio of specialized debt. The calculation is an additive process wherein the ranked parameters are combined together to give a final score represented by a single number. This number designates the "collectability" and the "base value" of the portfolio of delinquent specialized debt. It is within the scope of the present invention to supply an interactive flexible system such that the parameters can all be debated over by bidders and sellers alike. It is also within the scope of the present invention to provide a final arbiter to settle disputes and arrive at a final score.

A method of conducting an auction of delinquent specialized debt over the internet comprises the steps of: (a) providing a secure website for access by at least two selective buyers of said specialized debt; (b) obtaining over the website necessary information from the at least two selective buyers; wherein the necessary information comprises: (1) financial statement, (2) years in business, (3) experience with specialized debt, (4) industry affiliations, and (5) references; (c) rating the at least two selective buyers by use of a calculation that employs the necessary information to obtain a rating number for each of the two selective buyers; (d) contacting the at least two selective buyers over the website to advise them of their rating number; (e) allowing the at least two selective buyers to access a portfolio of specialized debt, provided that their rating number is acceptable. The portfolio of specialized debt is prepared according to the method as disclosed above.

The method further comprises the steps of: (f) accepting bids on the portfolio of specialized debt from the at least two selective buyers; (g) reviewing the bids on the portfolio of specialized debt; (h) determining a winner of the bidding on the portfolio of specialized debt; and (i) contacting the winner of the bidding on said portfolio. Preferably, steps (f) through (i) are conducted over the internet.

While the invention has been described by specific examples and embodiments, there is no intent to limit the inventive concept except as set forth in the following claims.

We claim:

1. A method for the organization of disorganized receivables comprising:
    organizing by a computer the disorganized receivables into a portfolio of organized receivables by a method including sorting the delinquent receivables by employing a sorting parameter to obtain sorted receivables, ranking the sorted receivables by employing a ranking parameter to obtain ranked receivables, and scoring the ranked receivables by employing a scoring parameter to obtain a final score; wherein the sorting parameter, for each specific account in the receivables, comprises:
    (a) outstanding unpaid balance on the account;
    (b) age of the account;
    (c) prior collection history of the account;
    (d) household income and home value of the debtor on the account;
    (e) geographic distribution of debtor, based on a parameter which is a member selected from a state, a zip code, a phone number, an employer and a work phone
    (f) type of debtor/payer classification selected from the group consisting of individual, business entity, insurance provider and government provider;
    wherein the ranking parameter comprises:
    (g) an intrinsic value for each sorting parameter (a)-(f);
    (h) a comparative value for each sorting parameter (a)-(f); and
    wherein the scoring parameter comprises a calculation to obtain the final score, and wherein the final score represents the collectability and the base value of the portfolio of organized receivables; and linking by an electronic input-output device the final score to a secure website on the internet.

2. The method according to claim 1 comprising viewing by electronic processors the final score by at least two debt collection agencies; and placing bids by the electronic processors on the final score by the at least two debt collection agencies.

3. The method according to claim 2 including contacting by a communications network the debt collection agency that submitted a winning bid, wherein the debt collection agency that submits the winning bid obtains an exclusive recovery right.

* * * * *